United States Patent [19]

Lewus

[11] Patent Number: 4,642,545
[45] Date of Patent: Feb. 10, 1987

[54] STATIC PHASE CONVERSION CIRCUITS FOR THREE-PHASE MOTORS

[76] Inventor: Alexander J. Lewus, 9844 N. 11th Ave., Phoenix, Ariz. 85021

[21] Appl. No.: 775,811

[22] Filed: Sep. 13, 1985

[51] Int. Cl.⁴ .............................................. H02P 1/44
[52] U.S. Cl. ..................................... 318/749; 318/729; 318/795
[58] Field of Search ............... 318/816, 817, 729, 749, 318/795, 438

[56] References Cited

U.S. PATENT DOCUMENTS

| | | | |
|---|---|---|---|
| 602,920 | 4/1898 | Steinmetz | 318/729 |
| 937,617 | 10/1909 | Lindquist | 318/749 |
| 1,741,518 | 12/1929 | Hough | 318/729 |

FOREIGN PATENT DOCUMENTS

| | | | |
|---|---|---|---|
| 510472 | 10/1930 | Fed. Rep. of Germany | 318/795 |
| 316684 | 7/1929 | United Kingdom | 318/749 |

OTHER PUBLICATIONS

Mukherjee et al., "Phase Converter for Three-Phase Induction Across Single Phase Supply", J. Inst. Eng. (India) Elec. Eng. Div. vol. 51 (Aug. 1971), No. 12, pp. 385-387.

Primary Examiner—David Smith, Jr.
Attorney, Agent, or Firm—Kinzer, Plyer, Dorn & McEachran

[57] ABSTRACT

A three-phase A.C. motor having three stator windings with stator winding power input terminals T1, T2 and T3, is energized from a single-phase A.C. line through a static phase conversion circuit that connects terminals T1 and T2 directly to the single phase line and that includes a main dephasing capacitor connected between terminals T1 and T2; a phase correction capacitor is connected in parallel with a stator winding that is not connected to terminal T3 for materially improved full load performance.

15 Claims, 7 Drawing Figures

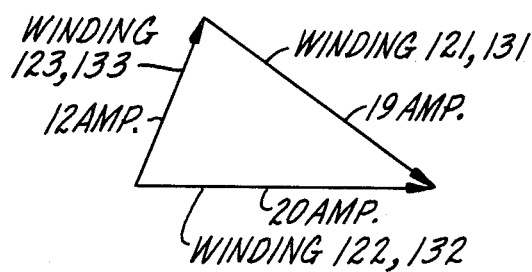
Fig. 3. START
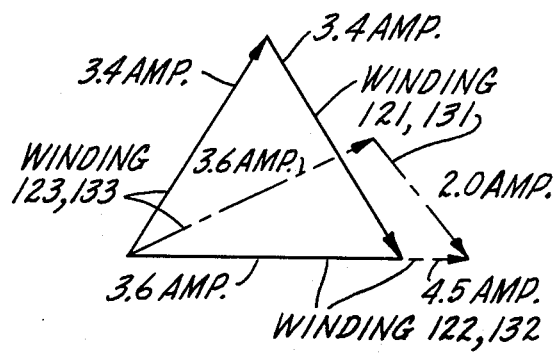
Fig. 5. FULL LOAD
Fig. 4. NO LOAD
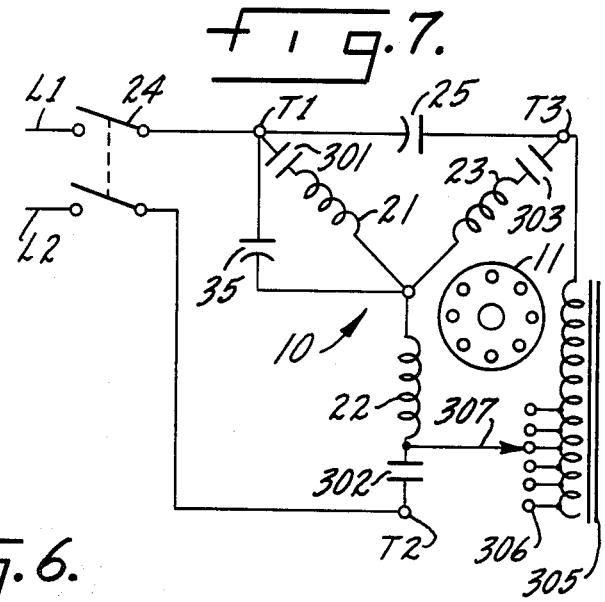
Fig. 7.
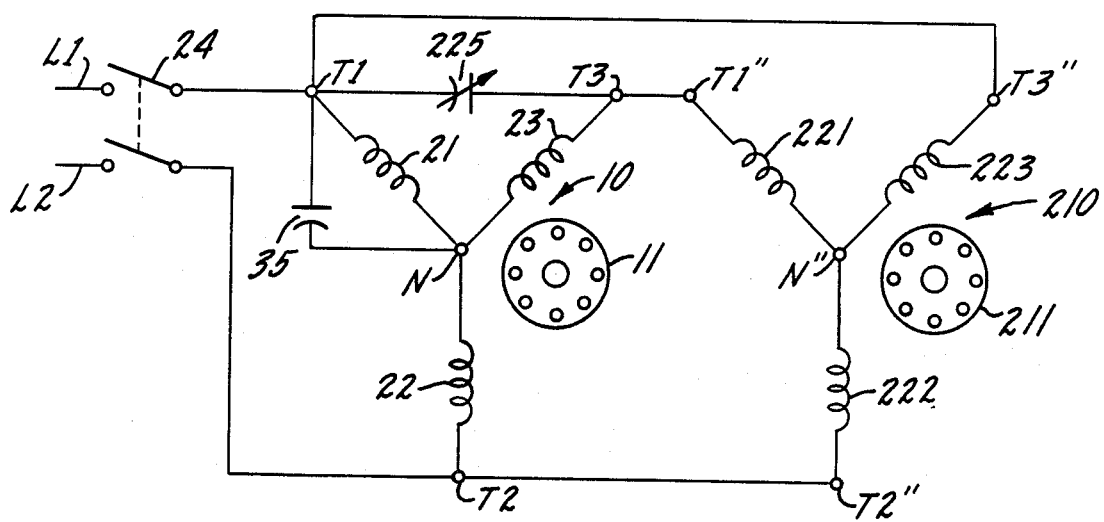
Fig. 6.

STATIC PHASE CONVERSION CIRCUITS FOR THREE-PHASE MOTORS

BACKGROUND OF THE INVENTION

There are many applications in which it is desirable to energize a three-phase A.C. induction motor from a single-phase power line, which may be the only available source of A.C. power at a given location. A conventional technique, in these circumstances, is to connect two of the three stator winding power input terminals directly to the power line conductors and to couple the third stator winding terminal to one of the power line conductors through a dephasing capacitor. For starting, an additional starting capacitor is connected in parallel with the dephasing capacitor. With this simple arrangement, the three-phase motor functions in a manner analogous to a capacitor-start capacitor-run single-phase induction motor.

This conventional static phase conversion circuit for operation of a three-phase motor from a single-phase A.C. line exhibits rather low efficiency and has a relatively poor power factor at full load, even with careful selection of the dephasing capacitor. For a motor run at variable loads or even at a relatively constant load, the power factor and efficiency are never really satisfactory.

SUMMARY OF THE INVENTION

It is an object of the present invention, therefore, to provide a new and improved static phase conversion circuit for operation of a three-phase A.C. induction motor from a single-phase line that is simple and inexpensive yet provides for substantial improvements in power factor and efficiency for full load operation of the motor.

A further object of the invention is to provide a new and improved static phase conversion circuit, energizing a three-phase motor from a single-phase line, that requires only one additional capacitor, as compared with the conventional circuit, and that may be applied to either wye-connected or delta-connected motors.

Accordingly, the invention relates to a static phase conversion circuit energizing a three-phase A.C. motor from a single-phase A.C. power line, comprising a three-phase motor comprising a rotor, a stator including three individual stator windings with each winding electrically displaced from the others by 120°, and three power input terminals T1, T2 and T3 each connected to at least one of the stator windings. Power input means are provided for connecting a single-phase A.C. line directly to the power input terminals T1 and T2, with no direct line connection to the power input terminal T3; a main dephasing capacitor is connected between the power input terminals T1 and T3; and a reactive phase correction impedance is connected in parallel with only one stator winding, that one stator winding being a winding that is not connected to the power input terminal T3.

BRIEF DESCRIPTION OF THE DRAWINGS

FIGS. 3, 4 and 5 graphically illustrate current and phase conditions in the circuit of FIG. 2 for various motor operating conditions; and FIGS. 6 and 7 are simplified schematic diagrams of additional embodiments of the invention.

DESCRIPTION OF THE PREFERRED EMBODIMENTS

Figure 1:
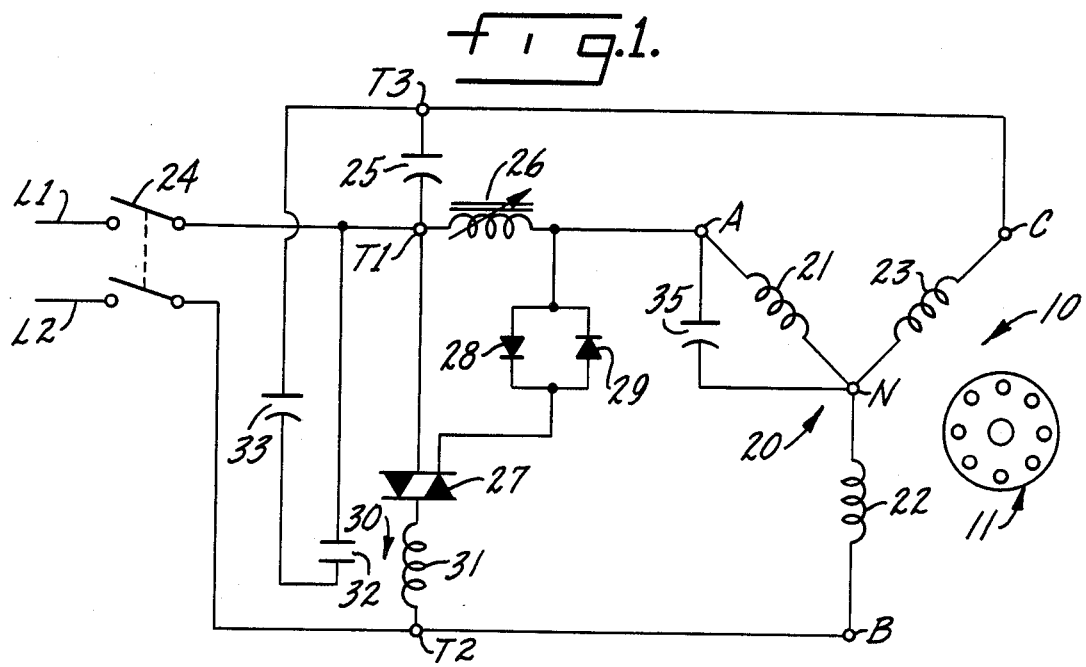
FIG. 1 is a schematic diagram of a static phase conversion circuit for a wye-connected three-phase A.C. motor illustrative of one embodiment of the invention.

FIG. 1 affords a schematic representation of a static phase conversion circuit for energization of a three-phase wye-connected A.C. induction motor 10 from a single-phase A.C. power line shown as the line L1, L2. Motor 10 includes a conventional induction rotor 11 and a wye-connected stator 20 including three stator windings 21, 22 and 23. Stator windings 21, 22 and 23 have end terminals A, B, and C, respectively; the other end of each of the stator windings is connected to a common terminal N. The stator winding terminals A, B and C are brought out to the exterior of the motor and connected to three power input terminals T1, T2 and T3, respectively.

As in a conventional static phase conversion circuit, the circuit for motor 10 shown in FIG. 1 has its power input terminals T1 and T2 connected directly to the power line conductors L1 and L2, respectively, through a two-pole starting switch 24. A main dephasing capacitor 25 is connected between motor terminals T1 and T3 and thus couples the internal terminals A and C of motor 10.

FIG. 1 shows a starting cirucit for motor 10. This starting circuit includes an inductance 26 having an adjustable iron core; inductance 26 is connected in series between terminals T1 and A to serve as a sensor for sensing the high current inrush occurring on starting of motor 10. The power line side of inductance 26 is connected to one main electrode of a triac 27 that is a part of the starting current sensor means. The motor side of inductance 26 is connected through a pair of parallel, oppositely-polarized diodes 28 and 29 to the gate electrode of triac 27.

The other main electrode of triac 27 is connected to the operating coil 31 of a start relay 30, coil 31 being returned to the external motor terminal T2 and hence being connected to line conductor L2. Relay 30 includes a set of normally open contacts 32. Contacts 32 are connected in series with a starting capacitor 33 in a circuit that couples power line L1 with motor terminal T3, so that starting capacitor 33 can be effectively paralleled with capacitor 25. The starting relay 30, though shown as an electromechanical relay, may comprise a solid state relay if desired.

As thus far described, the circuit shown in FIG. 1 corresponds to a conventional static phase conversion circuit for operation of a three-phase AC motor from a single-phase power line. When switch 24 is closed, the high starting inrush current to motor 10 produces a voltage differential across inductance 26 sufficient to drive triac 27 conductive, energizing coil 31. Relay contacts 32 close to complete a circuit for starting capacitor 33 that effectively places that capacitor in parallel with the main dephasing capacitor 25 across power input terminals T1 and T3 and hence across motor terminals A and C. As the motor starting current subsides, triac 27 is returned to its normal nonconductive state, the relay contacts 32 open, and starting capacitor 33 is effectively removed from the operating circuit of motor 10. It is thus seen that motor 10 functions in a manner analogous to a capacitor-start capacitor-run single-phase induction motor.

The sole change in the static phase conversion circuit of FIG. 1, as compared with conventional practice, is the addition of a second running capacitor, the phase correction capacitor 35. Capacitor 35 is connected in parallel with stator winding 21, from terminal A (and hence terminal T1) to terminal N. The capacitance of capacitor 35 may vary substantially, depending on the operating characteristics of motor 10; in a specific example described hereinafter the capacitance of phase correction capacitor 35 is half that of the main dephasing capacitor 25, but for other motors the phase correction capacitor 35 may have a capacitance equal to or even greater than the main dephasing capacitor 25. Capacitor 35 effectively modifies the phase relationships in motor 10, at full load, so that the motor develops a power output and has an efficiency equivalent to three phase operation.

Figure 2:
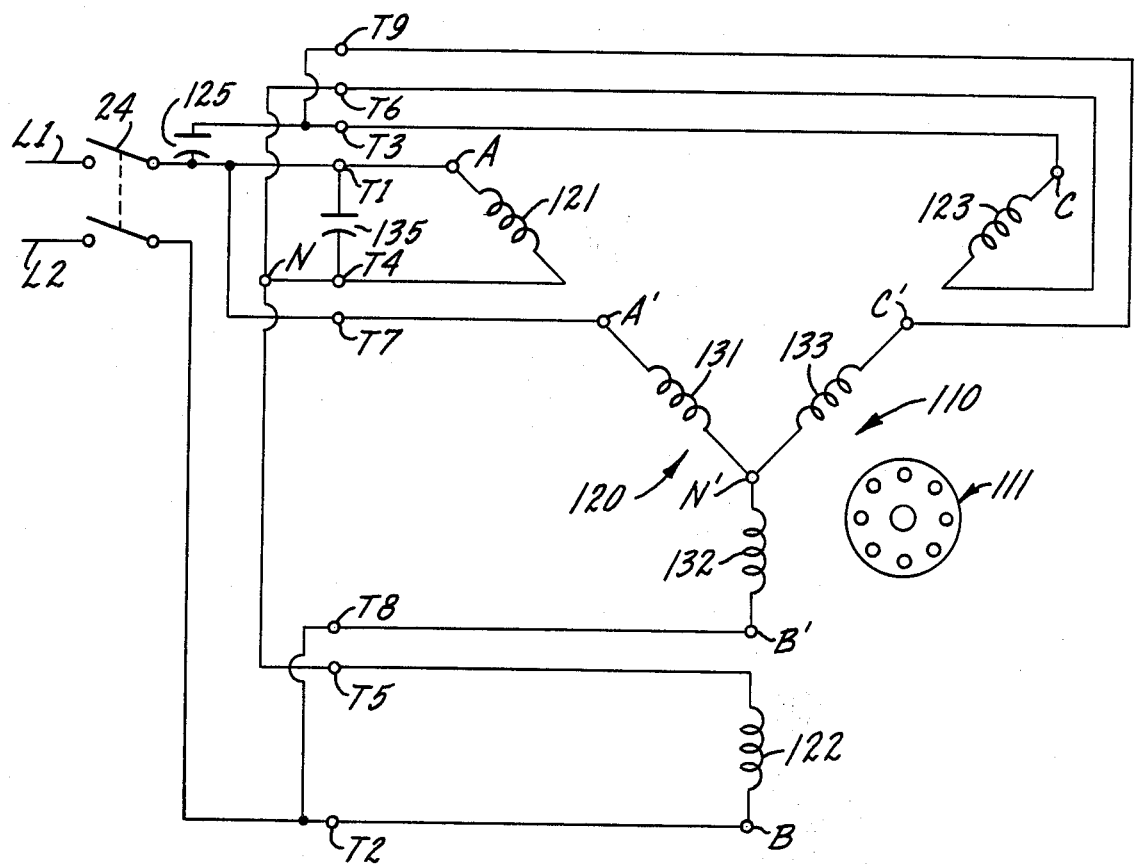
FIG. 2 is a simplified schematic diagram that illustrates the invention as applied to a dual voltage wye-connected three-phase motor.

FIG. 2 affords a schematic illustration of a static phase conversion circuit of the invention, like that of FIG. 1, applied to a dual voltage wye-connected three-phase A.C. induction motor 110 having a rotor 111. The stator 120 of motor 110 includes a first set of three stator windings 121, 122 and 123 having terminals A, B and C, respectively. Terminal A of winding 121 is connected to an external power input terminal T1, terminal B of winding 122 is connected to an external power input terminal T2, and terminal C of winding 123 is connected to an external power input terminal T3. In this instance, unlike the motor of FIG. 1, the stator windings 121, 122 and 123 are not connected together within the motor; instead, these windings are also connected to additional external terminals T4, T5, and T6, respectively.

The stator 120 of motor 110 includes three additional windings 131–133. Winding 131 has a terminal A' that is brought out to a power input terminal T7. Stator winding 132 has a terminal B' connected to an external power input terminal T8. The terminal C' of the third stator winding 133 in this set is connected to a an external power input terminal T9. Each of stator windings 131–132 is also connected to a common terminal N'.

In FIG. 2, motor 110 is shown with its stator windings connected for low voltage operation. Thus, the three external terminals T4, T5, and T6 are all interconnected to afford a common terminal N for stator windings 121, 122 and 123. Terminal T1 is connected to terminal T7, terminal T2 is connected to terminal T8, and terminal T3 is connected to terminal T9 so that the two sets of stator windings 121–123 and 131–133 are effectively paralleled with each other.

For energization of motor 110 from a single-phase power line L1, L2, one line conductor L1 is connected to terminal T1 and the other line conductor L2 is connected to terminal T2 through switch 24, in the same manner as in FIG. 1. Of course, switch 24 also connects conductor L1 to terminal T7 and connects conductor L2 to terminal T8 in the illustrated low voltage configuration for the nine-terminal motor 110. There is no direct connection from either of the power line conductors L1 and L2 to the terminals T3 and T9 that constitute the external power input terminals for coils 123 and 133.

A main dephasing capacitor 125 is connected between the power input terminals T1 and T3 of motor 110, effectively coupling line conductor L1 to winding terminals C and C'. A phase correction capacitor 135 is connected between terminals T1 and T4 and thus is in parallel with stator winding 121, duplicating the circuit arrangement of FIG. 1. It is thus seen that FIG. 2 affords essentially the same static phase conversion circuit for motor 110 as is provided for motor 10 in FIG. 1. FIG. 2 does not show a starting circuit for motor 110. That circuit would be the same as described in connection with FIG. 1, and would include a starting capacitor paralleled with capacitor 125 for starting only.

For high voltage operation, the external circuit connections shown in FIG. 2 may be modified to connect the two sets of stator windings in series rather than in parallel. Thus, the previously described interconnections for the external terminals T1–T9 are omitted for high voltage operation, but terminals T4 and T7, terminals T5 and T8, and terminals T6 and T9 are interconnected to place the stator windings in series for each motor phase. The phase correction capacitor 135 may remain connected as shown or may be re-connected from terminal T1 to terminal N' instead of to terminal T4.

The results of a series of measurements applied to a motor corresponding to motor 110 of FIG. 2, in its low voltage configuration, are set forth in Table I. These measurements are derived from a one horsepower Doerr motor having a voltage rating of 230/460 volts, a rated speed of 1740 rpm, and a rated full load current of 3.6 amperes; this is a 40° temperature rise motor on a 143T frame with a 1.15 service factor, code K. Capacitor values for these measurements were: capacitor 125 thirty-five microfarads, capacitor 135 twenty microfarads. A starting capacitor of 175 microfarads incorporated in a circuit like that for capacitor 33, FIG. 1, was utilized.

TABLE I

| With Cap. 135 | Current, 121,131 | Current, 122,131 | Current, 123,133 |
|---|---|---|---|
| Start | 19 | 20 | 12 |
| No Load | 4.2 | 2.0 | 3.8 |
| Full Load | 3.4 | 3.6 | 3.4 |
| Without Cap. 135 | Current, 121,131 | Current, 122,132 | Current, 123,133 |
| Start | 19 | 20 | 12 |
| No Load | 2.0 | 2.5 | 3.0 |
| Full Load | 2.0 | 4.5 | 3.6 |

In a second series of measurements, using the same apparatus as for Table I but with capacitor 125 at forty microfarads, the following data were obtained:

TABLE II

| | Current, 121,131 | Current, 122,132 | Current, 123,133 |
|---|---|---|---|
| Start | 19 | 20 | 13 |
| No Load | 5.0 | 1.8 | 4.3 |
| Full Load | 3.5 | 3.65 | 3.6 |

FIG. 3 shows the amplitude and phase relationships for the currents in the stator windings on start-up of the motor, utilizing the data from Table I. As is apparent from FIG. 3 and from the values set forth in Table I, the currents in windings 121,131 and 122,132 are substantially higher than the current in windings 123,133 and the phase relationships are not balanced. This start-up performance is essentially similar to that which would be realized without the additional phase correction capacitor 135; the circuit of the invention affords no major start-up improvement. The same situation applies to the no load conditions illustrated in FIG. 4. In FIG.

4, the solid lines show the current and phase relationships occurring within the stator windings for the complete circuit arrangement of FIG. 2, with additional capacitor 125 connected in the circuit. It can be seen that this represents somewhat poorer operating conditions than for the same circuit without capacitor 135, indicated by the phantom lines of FIG. 4.

FIG. 5 illustrates the basic advantage and benefit of the invention. The phantom lines in FIG. 5 represent the current amplitudes and phase relationships for the stator windings realized with a conventional circuit lacking the phase correction capacitor 135. The differential in currents is substantial, 3.6 amperes in each of the windings 122,132 and 123,133 and only 2.0 amperes in windings 121,131. The phase relationships are not balanced; as a consequence, the power factor is relatively low and the efficiency of the motor is substantially less than desirable. In comparison, the solid lines in FIG. 5, indicative of circuit performance with the phase correction capacitor 135 in place, show a marked improvement. The currents in all of the stator windings are essentially equalized, with the current in stator windings 122,132 at 3.6 amperes and the currents in each of the remaining stator windings 121,131,123 and 133 at 3.4 amperes. The phase relations are quite close to equalization; the imbalance does not exceed 3%. For operation of motor 110 under full load, therefore, there is a substantial saving in input energy costs and overheating of the motor is avoided, even though use may be maintained over a long time interval. In addition, the power factor is quite high. The actual performance of motor 110 for full load conditions, as set forth in Table I and shown in FIG. 5, closely approaches the performance that would be realized through energization of the motor from a three phase supply.

FIG. 6 illustrates another embodiment of the invention in which the motor 10 of FIG. 1, with its previously described static phase conversion circuit, is utilized as a rotary phase converter to drive another three phase motor 210. In FIG. 6, the illustration of motor 10 has been simplified by eliminating the starting circuit. As before, the stator windings 21, 22 and 23 of motor 10 are connected to power input terminals T1, T2, and T3 respectively. The power input terminals T1 and T2 are directly connected to a single phase line L1, L2 through a switch 24. A main dephasing capacitor is connected between the power input terminals T1 and T3; in this instance, the main dephasing capacitor is shown as a variable capacitor 225. A phase correction capacitor 35 is connected in parallel with stator winding 21 between its power input terminal T1 and the common terminal N for all three stator windings.

The second motor 210 has the same basic construction as motor 10 and includes three stator windings 221, 222 and 223 connected to a common terminal N". The power input terminal T1" of winding 221 is directly connected to terminal T3 of motor 10. The power input terminal T2" of stator winding 222 is connected to terminal T2 of motor 10. The power input terminal T3" of winding 223 is connected to terminal T1 of motor 10. The rotor of motor 210 is indicated at 211.

In operation of the circuit of FIG. 6, motor 10 functions at no load; the working motor is motor 210. That is, in the construction of FIG. 6 motor 10 functions as a rotary phase converter to supply three phase power to motor 210. The basic advantage remains the same; for full load conditions motor 210 operates with a power output and phase and current relationships essentially equivalent to its rated operation from a three phase line.

FIG. 7 illustrates a further embodiment of the invention in which motor 10 is connected in a static phase conversion circuit corresponding to that of FIG. 1 but with three sets of motor starter contacts 301, 302 and 303 connected in the circuit in series with stator windings 21, 22 and 23, respectively. In addition, power input terminal T3 of motor 10 is connected to one end of an inductance 305 having a plurality of taps 306. The outer end of stator winding 22, ahead of starter contacts 302, is connected to one of the taps 306 by a circuit connection 307. The circuit of FIG. 7 functions in the same manner as described above for FIG. 1, with the inductance 305 serving to preclude the possibility of series resonance in the operating circuit for motor 10. In some instances it may be preferable to replace inductance 305 with a conventional single phase motor. The circuit of FIG. 7 has the further advantage of providing a relatively high starting torque for motor 10.

Starting circuits have not been illustrated in FIGS. 2, 6 or 7. In each, it should be understood that an appropriate starting circuit is to be employed for coupling a starting capacitor in parallel with the main dephasing capacitor for start conditions.

For each illustrated embodiment of the invention the three-phase motor, when operating at its rated current for three-phase full load operation, delivers a power output approximately equal to its full load rating, thus exhibiting a substantial improvement over conventional single-phase conversion circuits. The full load power factor for single-phase is usually at least about 98%, again a major improvement in relation to the most prevalent conventional circuit. Yet these improvements are achieved by the addition of only a single capacitor in each instance.

I claim:

1. A phase conversion circuit for energizing a three-phase A.C. motor from a single-phase A.C. power line, comprising:
   a three-phase motor comprising a rotor, a stator including three individual stator windings with each winding electrically displaced from the others by 120°, and three power input terminals T1, T2 and T3 each connected to at least one of the stator windings;
   power input means for connecting a single-phase A.C. line directly to the power input terminals T1 and T2, with no direct line connection to the power input terminal T3;
   a main dephasing capacitor coupling power input terminal T1 to power input terminal T3; and
   a reactive phase correction impedance connected in parallel with only one stator winding, that one stator winding being a winding that is connected to the power input terminal T3.

2. A phase conversion circuit according to claim 1 in which the phase correction impedance is a capacitance.

3. A phase conversion circuit according to claim 1 in which the three stator windings are connected in wye configuration, with each winding connected between one of the power input terminals and a common terminal N, and in which the phase correction impedance is a capacitor connected between terminals T1 and N.

4. A phase conversion circuit according to claim 3 in which the capacitance of the phase correction capacitor is of the same order of magnitude as the main dephasing capacitor.

5. A phase conversion circuit according to claim 3 in which the motor is a dual voltage motor, the stator further comprising three additional stator windings connectable in series or in parallel with said stator windings.

6. A static phase conversion circuit according to claim 5 in which the capacitance of the phase correction capacitor is of the same order of magnitude as the main dephasing capacitor.

7. A phase conversion circuit according to claim 1, and further comprising:
   a starting capacitor;
   sensing means for sensing a high inrush current occurring upon starting of the motor;
   and relay means, responsive to the sensing means, for connecting the starting capacitor between terminals T1 and T3, in parallel with the main dephasing capacitor, only during starting of the motor.

8. A phase conversion circuit according to claim 7 in which the phase correction impedance is a capacitance.

9. A phase conversion circuit according to claim 8 in which the capacitance of the phase correction capacitor is of the same order of magnitude as the main dephasing capacitor.

10. A phase conversion circuit according to claim 2 and further comprising an anti-resonant inductance connected between terminals T3 and T2.

11. A phase conversion circuit according to claim 10 in which the anti-resonant inductance is an iron-core inductance coil having a plurality of taps for varying its effective inductance.

12. A phase conversion circuit according to claim 1, in which the motor functions as a rotary phase convertor for a three-phase electrical device having three power input terminals T1'', T2'' an T3'' each connected to one of the terminals T1, T2 and T3 of the motor.

13. A phase conversion circuit according to claim 12 in which the phase correction impedance is a capacitance.

14. A phase conversion circuit according to claim 13 in which the electrical device is a second three-phase motor.

15. A phase conversion circuit according to claim 13 in which the capacitance of the phase correction capacitor is of the same order of magnitude as the main dephasing capacitor.

* * * * *

UNITED STATES PATENT AND TRADEMARK OFFICE
CERTIFICATE OF CORRECTION

PATENT NO. : 4,642,545
DATED : February 10, 1987
INVENTOR(S) : Alexander J. Lewus It is certified that error appears in the above—identified patent and that said Letters Patent is hereby corrected as shown below:

In line 7 of the Abstract cancel "T2" and substitute --T3--.

In column 6, line 55, after "is" insert --not--.

Signed and Sealed this

First Day of December, 1987

*Attest:*

DONALD J. QUIGG

*Attesting Officer*    *Commissioner of Patents and Trademarks*